United States Patent [19]

Hareng et al.

[11] 4,202,010

[45] May 6, 1980

[54] THERMOELECTRIC DISPLAY CELL FOR RECORDING IMAGES LINE BY LINE

[75] Inventors: Michel Hareng; Serge Le Berre, both of Paris, France

[73] Assignee: Thomson-CSF, Paris, France

[21] Appl. No.: 902,112

[22] Filed: May 2, 1978

[30] Foreign Application Priority Data

May 5, 1977 [FR] France .................................. 77 13738

[51] Int. Cl.$^2$ .......................... H04N 9/30; H04N 5/66; G02F 1/13; G09F 9/30
[52] U.S. Cl. ..................................... 358/56; 358/230; 340/784; 350/351
[58] Field of Search ................. 358/213, 236, 56, 230, 358/59, 60; 340/324 M, 765, 784; 350/333, 351

[56] References Cited

U.S. PATENT DOCUMENTS

| 3,410,999 | 11/1968 | Fergason et al. | 350/351 |
| 3,637,291 | 1/1972 | Kessler et al. | 350/351 |

*Primary Examiner*—John C. Martin
*Attorney, Agent, or Firm*—Cushman, Darby & Cushman

[57] ABSTRACT

A device for displaying a television video signal comprising a liquid-crystal layer inserted between two substrates. A plurality of heating lines deposited onto one substrate heats successively the layer up to an erasure temperature. A plurality of columns apply to the liquid crystal layer during the cooling of each line, samples of a video signal representing the image to be displayed. The lines of the image are thus recorded one after the other and all the dots of one line are simultaneously recorded thus allowing the layer to be heated and cooled along one line during the duration of one TV line scan.

16 Claims, 8 Drawing Figures

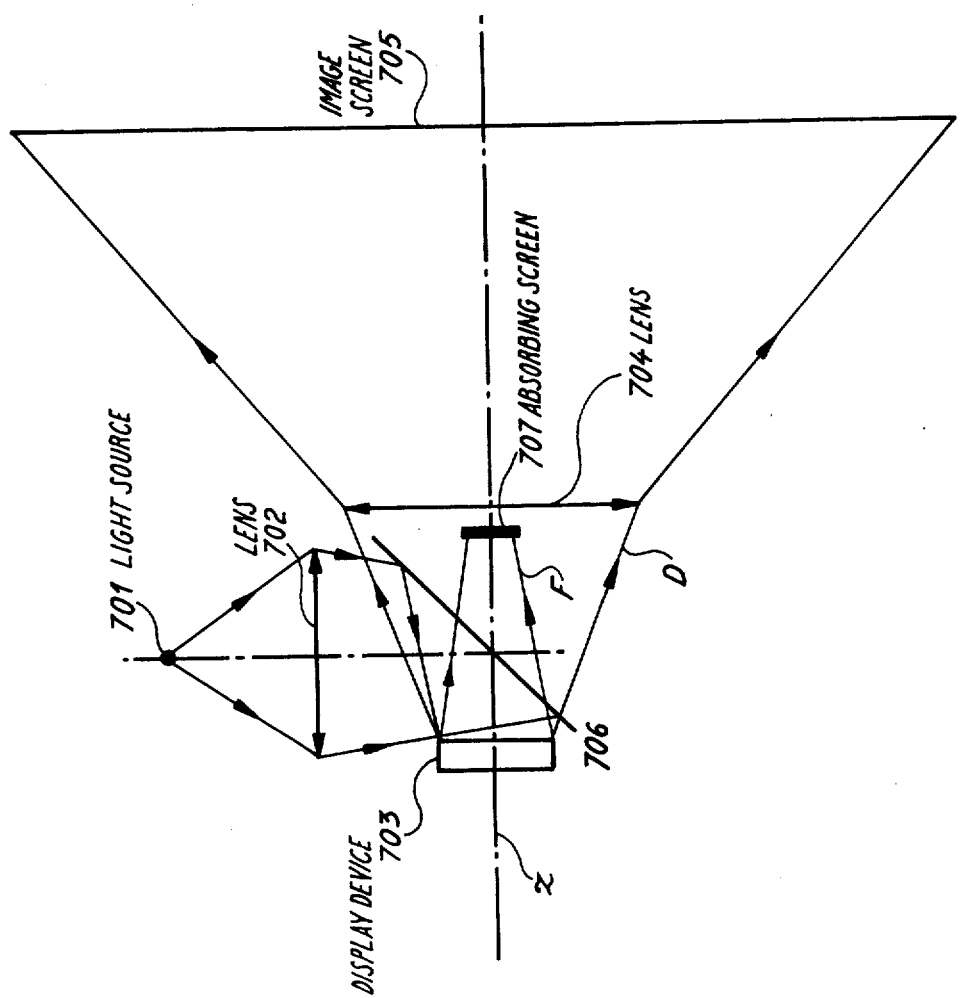

THERMOELECTRIC DISPLAY CELL FOR RECORDING IMAGES LINE BY LINE

BACKGROUND OF THE INVENTION

This invention relates to display devices for displaying a singe image or a series of images represented by an electrical signal commonly known as a video signal.

Such a device may be used in a television system, particularly for projecting televised images onto a large screen.

It is known that a cathode ray tube may be used for displaying an image, but such a tube wastes a large volume of space for displaying such a flat image.

Accordingly, numerous devices have been proposed to replace cathode ray tubes, but the results have always been disappointing. In some cases, the structure is complicated and brilliance is poor, as in the case of plasma screens such as that described by Yoshifumi Amano in the Journal "IEEE Transactions on Electron Devices", Vol. ED-22, No. 1, January, 1975. In other cases, the response time is slow thereby precluding use in a television system, as in the case of the numerous liquid-crystal devices with which experiments have hitherto been conducted.

French Pat. No. 2,275,087 granted to the Applicants herein on Feb. 13, 1976 on the basis of an application filed on June 14, 1974, describes a display arrangement which utilizes a thermo-electric effect in a liquid crystal layer, the image being recorded by scanning the layer with an infrared beam produced by a laser and deflected by electro-optical or acousto-optical deflectors.

This light source and these deflectors are both unwieldy to use and expensive to produce. However, the most serious disadvantage is that the scan used has to be slow enough to allow a local dot-by-dot phase change of the liquid crystal layer in response to the heat supplied by the infrared beam. A thermal phenomenon used in this manner is too slow to enable the arrangement to be utilized in a television system.

SUMMARY OF THE INVENTION

The object of the present invention is to increase the speed with which the image is recorded in a layer of material showing a thermo-electric effect of the type in question using elements enabling this image to be recorded line-by-line, so that the duration of a line is available for simultaneously recording all the dots composing that line.

In accordance with the present invention, there is provided a display device for displaying images represented by a video signal comprising successive portions, said device comprising:

a thermo-electric recordable layer presenting an erasure temperature;

means for heating above said temperature said layer according to a plurality of lines; said lines being heated temporarily one after the other and each line being heated simultaneously along its length;

means for applying to said layer along all said lines after the heating of one of said lines and until said one line cools under said erasure temperature, an electrical field representing one of said successive portions of the video signal; whereby said one portion is writen into said one line.

BRIEF DESCRIPTION OF THE DRAWINGS

For a better understanding of the invention, and to show how the same may be carried into effect, reference will be made to the ensuing description and to the attached figures among which:

FIG. 7 illustrates the diagram of a second embodiment of a system for projecting the image displayed on the device of FIG. 2.

DESCRIPTION OF THE PREFERRED EMBODIMENTS

Figure 1:
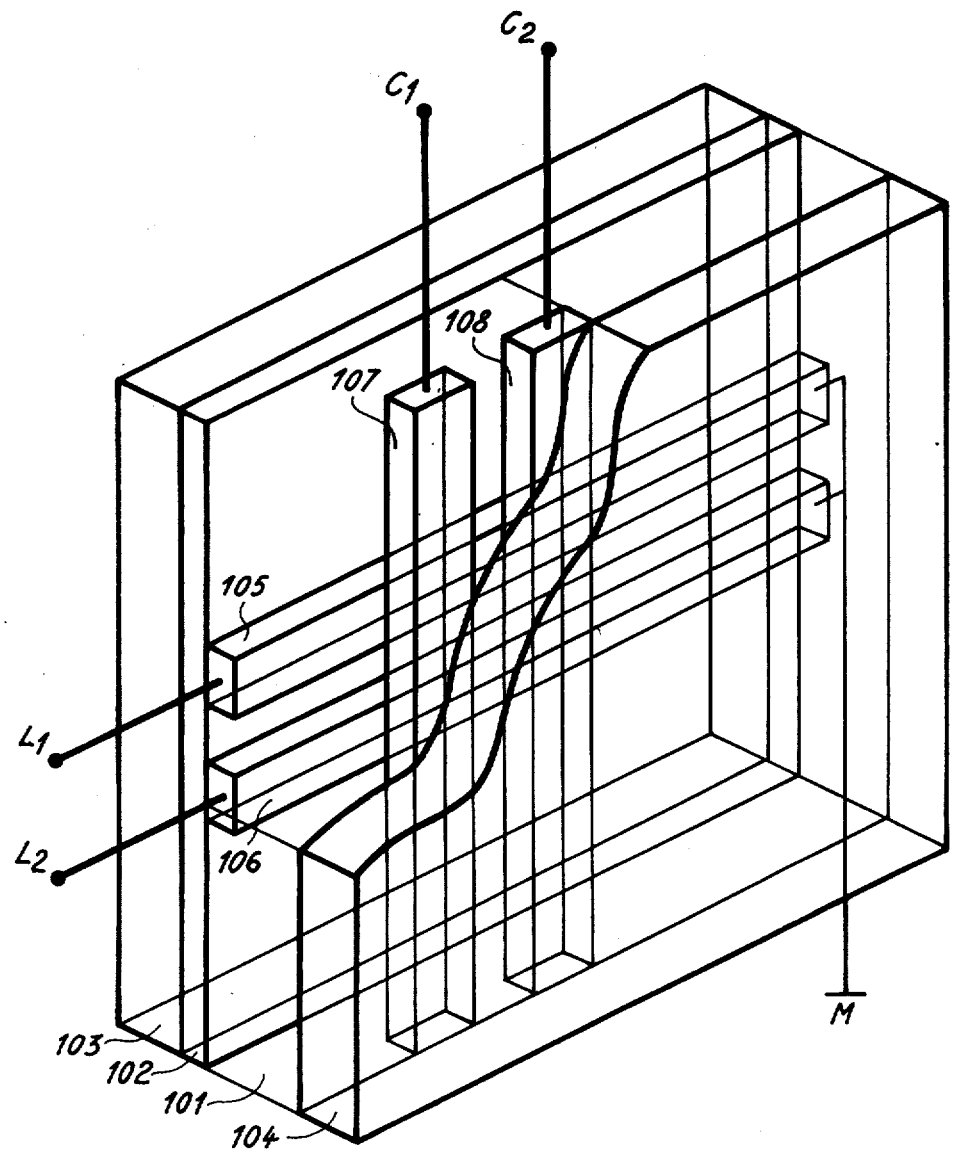
FIG. 1 illustrates a sectional view of a display cell comprising 4 display points.

FIG. 1 shows a very simple display cell which, in the interest of clarity, is limited to two lines and two columns enabling an image composed of four dots arranged in a square to be displayed.

A thin layer of liquid crystal 101 is inserted between a layer of silicon dioxide ($SiO_2$) 102 obtained by oxidizing a first substrate 103 of silicon, and a second substrate 104 of sapphire. It is held in position by shims (not shown).

Conductor lines 105 and 106, made e.g. of aluminum, are deposited on the layer of silicon in contact with the liquid crystal. They serve as heating resistances when they are fed through the connections $L_1$ and $L_2$ brought to an electrical potential in relation to a common earth connection M and enable the temperature of the liquid crystal to be locally increased along the entire line thus fed.

The liquid crystal thus heated is preferably of a type having a smectic A phase and a nematic phase. Good results have been obtained with compounds of the cyanobiphenyl group used either on their own or in admixture, and in particular with cyanooctyl biphenyl (COB in short) of which the structure is represented by the following formula:

COB is characterised by a smectic-nematic transition at 32.5° C. and by a nematic-isotropic transition at 40.5° C.

By thermostatically controlling the display cell to a few degrees below the smectic-nematic transition, the increase in temperature produced by the heating effect of the resistance line enables the liquid crystal along that line to be brought into the isotropic phase in a very short time.

When the voltage applied to the line used is cut off, the heat is essentially dissipated through the substrate 103 which is a good heat conductor. By contrast, the layer 102 of $SiO_2$, which is a poor heat conductor tends to limit the heat dissipation rate. If, therefore, the response time of the system is required to be short, the layer 102 has to be thin to ensure rapid cooling. However, this approach is limited because this dissipation effect occurs also in evidence during heating, which means that as the layer 102 is made thinner the heating power has to be increased at the risk of melting the heating lines.

Good results have been obtained in a more complex cell than that illustrated in FIG. 1 and comprising 600 lines and 800 columns by using aluminium lines with a thickness of 1 μm for a width of 15 μm and a length of 2 cm spaced 5 μm apart from one another and deposited onto a layer of $SiO_2$ having a thickness of 3 μm. These lines had a resistance of approximately 50 ohms and enabled the nematic-isotropic transition of a 15 μm thick layer of COB to be obtained in less than 60 μs under a feed voltage of 25 V. The return to the smectic state also took place in less than 60 μs.

When the liquid crystal cools as quickly as this, it assumes so-called conic focal structure which gives it a diffusing appearance opposite to that (completely transparent) of the liquid phase and the normal homeotropic phase. Accordingly, by applying an electrical field (corresponding to a voltage) perpendicular to the liquid crystal layer during its cooling, a more or less diffusing structure, depending on the value of that field, is obtained. Thus, in this cell, the crystal is completely diffusing for a voltage of 10 V and completely transparent for a voltage of 20 V, the transparency percentage varying substantially linearly with the voltage.

An effect such as this, which provides for recording under the action of the electrical field during the cooling of a material, is known as a thermo-optical effect. It is not specific to liquid crystals, particularly of the COB-type, and occurs in particular in lithium niobate doped with iron, in which the recording is reflected in a variation in index. It would also be possible to start with a diffusing liquid crystal and to return it to a more or less diffusing state after heating.

Transparent conductor lines 107 and 108, for example of tin oxide ($SnO_2$), are deposited on that surface of the substrate 104 which is in contact with the layer 101 and perpendicularly of the lines 105 and 106. In the example described, the width and the spacing of these columns are identical with those of the lines to obtain substantially square elementary recording dots at the intersection points of the lines and columns. The thickness of the layer of $SnO_2$ is minimal to obtain a high degree of transparency, although its value is by no means critical because the current delivered is substantially zero.

By applying a d.c. or a.c. potential to one or both columns, an electrical field is developed between them and the lines of which one end is earthed. The value of this field is constant only along aline which is not supplied with heating current because, in the opposite case, the line potential decreases from the side corresponding to the connection $L_1$ or $L_2$ to the side which is connected to earth. However, this is unimportant because the recording phenomenon only occurs on cooling, i.e. when the line is not supplied with heating current and thus has a constant potential.

Accordingly, four dots of which the power of diffusion may be continuously controlled from a zero value to a maximum value, may be recorded in the liquid crystal layer 101 respectively at the intersection points of the lines 105, 106 with the columns 107, 108.

It is pointed out that recording is of necessity carried out line by line because, when a line heats the crystal, it erases the preceding recording both at the intersection with one column and at the intersection with the other column, so that the dots corresponding to these two intersections have to be re-recorded. Conversely, if the two lines were to heat simultaneously, the same column would simultaneously record the same information at its intersections with the lines.

The cell illustrated in FIG. 1 is essentially experimental. Using the results obtained from this cell, it has been possible to construct the display device illustrated diagrammatically in FIG. 2 which comprises 600 Lines $LA_1$ to $LA_{600}$ on a first substrate 203 of silicon and 800 columns $CA_1$ to $CA_{800}$ on a second substrate 204 of sapphire. With the shim 201, these substrates delimit a layer of liquid crystal. These values (600 and 800) have been selected to allow the display of a television program under the European Standards of 625 lines and 25 frames per second, allowing for the time in the lines and frame returns. Accordingly, these standards correspond to a line duration of 64 μs which is compatible with the numerical values quoted above and which allow heating and cooling times per line of less than 60μ. The line duration in US standard is substantially the same and a device with 500 lines and 660 columns should be convenient.

A television video signal is applied by the connection VS to a sampling circuit 205. This circuit samples the video signal and memorizes the samples thus obtained under the control of a clock signal which arrives by the connection HC and a line synchronization signal which is applied to the sampling circuit by the connection HL. In this way, 800 samples of the video signal taken over the duration of one scanning line are available at the 800 connections $C_1$ to $C_{800}$ every 64 μs and for a duration of 64 μs, so that this scanning line begins at $C_1$ and ends at $C_{800}$. These connections are connected to the columns CA supported by the substrate 204.

The circuit 205 is formed on the substrate 204 itself by integration using the known, so-called SOS method. During integration by this method, both the connections $C_1$ to $C_{800}$ and the display columns $CA_1$ to $CA_{800}$ are formed by evaporation. This solves the problem posed by the interconnections which is known to be a serious problem in all matrix access systems. This is because, once the production masks have been formed, the connections as a whole are formed in a single, simple and inexpensive operation incorporated in the production process of an integrated circuit. The dimensions of the circuit are not prohibitive by virtue of the value of the devices (cathode ray tubes for example) which the display device according to the invention enables to be replaced.

Accordingly, to record the sampled and memorized lines, a line, for example $LA_j$, is heated for the period during which the corresponding video signal arrives in the circuit 205, after which the voltages applied to heat that line is cut off and the sampled voltages are applied to the columns CA in the period during which the video signal corresponding to the line $LA_{j+1}$ arrives in the circuit 205. During this same period, this line $LA_{j+1}$ is heated to prepare it recording, and so on for a non-interlaced image.

To obtain this successive heating sequence of the lines, they are fed by means of the circuit 206 which is itself formed on the substrate 203, preferably by integration. In one step of this integration process, there are formed the connections $L_1$ to $L_{600}$ and the lines $LA_1$ to $LA_{600}$ which are themselves only an extension of these connections because they can be made of the same material, for example aluminum.

It has been possible to obtain a line heating rate of less than 10 $\mu s$ by increasing the power applied to the lines and a cooling rate of less than 50 $\mu s$ by reducing the thickness of the layer of $SiO_2$. Accordingly, the complete recording cycle may be carried out over the duration of one line. In an other embodiment a line is recording during the heating of the following one.

The circuit 206 receives clock signals at the frequency of the succession of the lines in the video signal through the connection HL, clock signals at the frequency of the succession of the fields through the connection HT and a feed voltage for heating the lines LA through the connection VT. The other feed connections for the circuits 205 and 206 have not been shown, nor has the common earth at the right-hand end of the lines.

Figure 3:
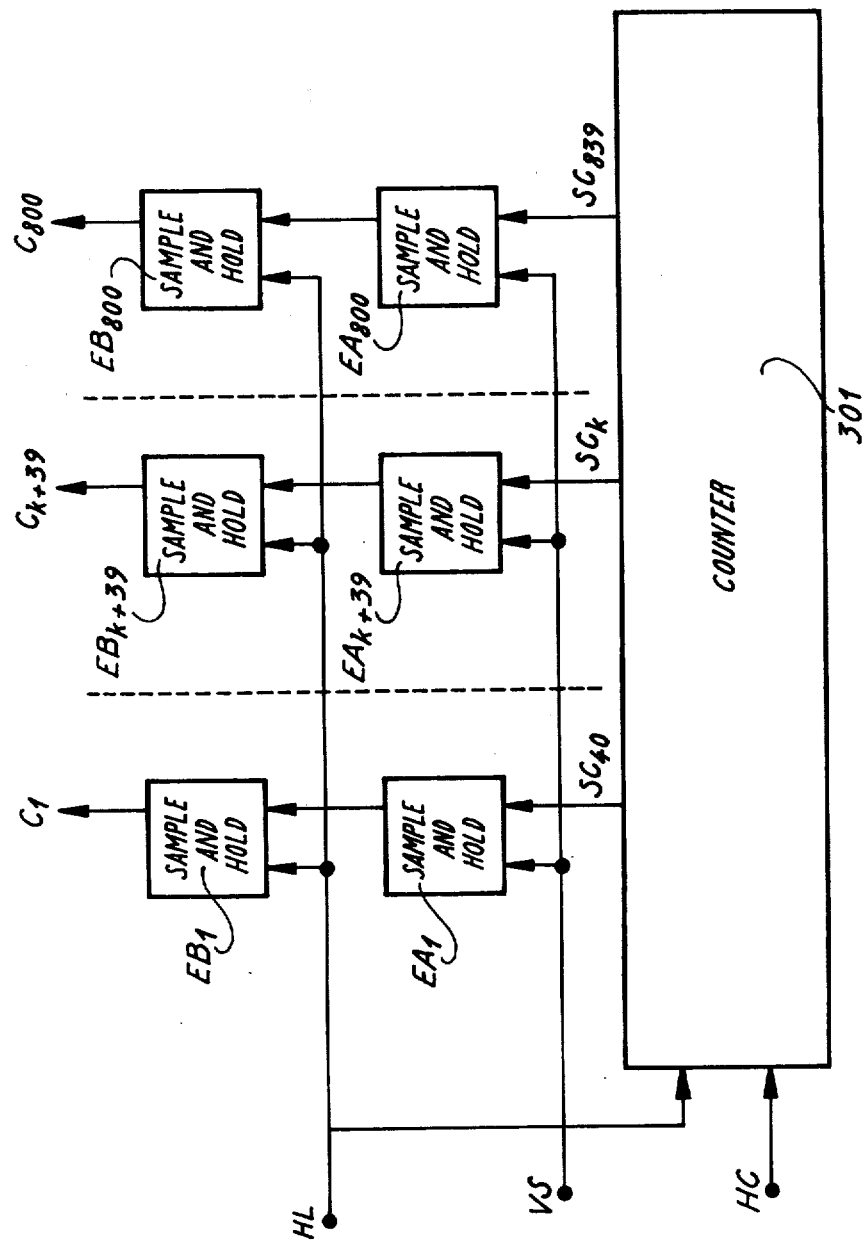
FIG. 3 illustrates the block diagram of the control means 205 shown in FIG. 2.

FIG. 3 illustrates one example of embodiment of the circuit 205.

The clock signals HC arrive at a counter 301. For obtaining a horizontal definition substantially equal to the vertical definition, a rate equal to 880 times the rate of the line synchronization signals has been selected for the clock signals HC, the fraction of the scanning line lost for synchronization being estimated at 10%. Accordingly, the counter 301 counts at the frequency of the signals HC and, for synchronization, it is symmetrically reset to zero by the line synchronization signal arriving at the connection HL. Assuming for example that the lost part of the video signal is situated halfway in front of and behind the line synchronization pulse, it can be seen that the 800 samples to be taken from this video signal are situated between the states 40 and 839 of the counter. Each of these states is decoded and successively gives a logic signal on the connections $SC_{40}$ to $SC_{839}$.

These connections are respectively connected to 800 sample and hold circuits $EA_1$ to $EA_{800}$ which permanently receive the video signal VS. Thus, as the counter 301 progresses from 40 to 839, the sample and hold circuits EA sample the video signal in turn under the control of the counter and memorize the samples thus taken.

The outputs of the circuits EA are respectively connected to the inputs of 800 other sample and hold circuits $EB_1$ to $EB_{800}$ which simultaneously receive in parallel at their sampling control input the line synchronization signal through the connection HL. Thus, when the counter 301 is restarted, the samples contained in the circuits EA are transferred to the circuits EB which memorize them for the duration of the following line, the circuits EA then becoming available again. The outputs of the circuits EB are precisely the connections $C_1$ to $C_{800}$ at which are thus present for the duration of one line the samples of the video signal which were taken during the preceding line.

Figure 4:
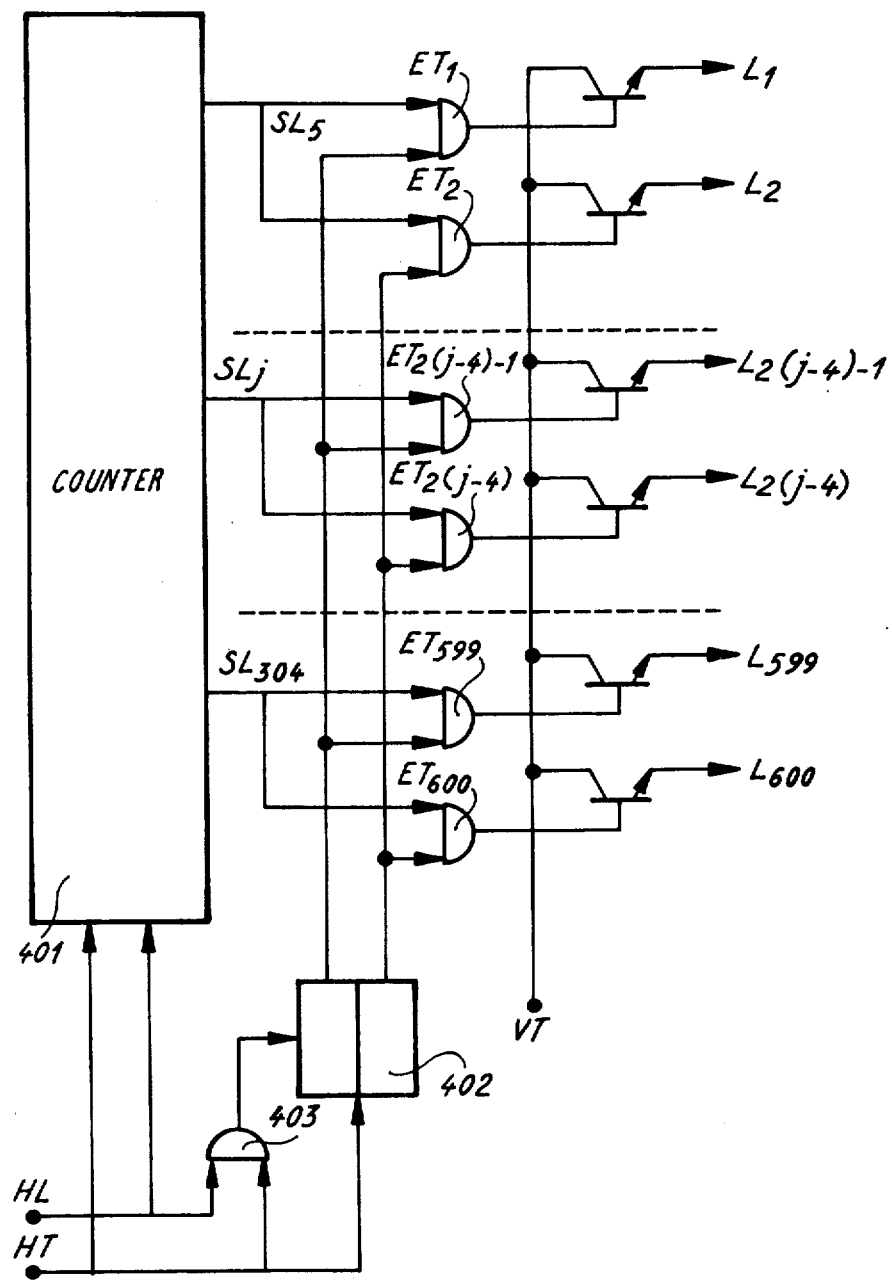
FIG. 4 illustrates the block diagram of the control means 206 shown in FIG. 2.

FIG. 4 illustrates an embodiment of the circuit 206 in the case where the recorded image is made up of two interlaced frames of 312 and a half lines.

The line synchronization signals arrive at a counter 401 through the connection HL. This counter also receives the frame synchronization signals through the connection HT which enables the counter to be reset to zero at the beginning of a frame. The counter 401 therefore counts at the frequency of the signals HL. Assuming for example that 12.5 lines are lost for the frame synchronization, of which 5 complete lines are lost at the beginning and 7 complete lines at the end of a frame, the half line required for interlacing being situated at the end of an odd frame and at the beginning of an even frame, it can be seen that the 300 lines of a frame which are to be recorded correspond to the states 5 to 304 of the counter. Each of these states is decoded and successively gives a logic signal at the 300 connections $SL_5$ to $SL_{304}$.

Each of these connections leads to one pair of AND-gates of the plurality of gates $ET_1$ to $ET_{600}$. The output of each these gates is connected to the base of an NPN transistor. The collectors of these transistors are connected in parallel to the connection VT (power supply for heating the lines), whilst their emitters are respectively connected to the connections $L_1$ to $L_{600}$.

In order to select the even/odd frames, the frame synchronization signal is applied by the connection HT to a bistable circuit 402 which changes state at the frequency of these signals and of which one of the outputs is connected in parallel to the inputs of the AND-gates of even index and the other to the inputs of the AND-gates of odd index. Thus, the counter will successively open the 300 odd-index gates which themselves will unblock the 300 corresponding transistors for successively heating the 300 odd lines, after which this same counter will successively open the 300 even-index gates for successively heating the 300 even lines. To ensure that interlacing is correct, the trigger circuit 402 is set into the state enabling the odd gates to be opened at the beginning of the odd frames. To this end, the line and frame synchronization pulses are applied by the connections HL and HT to an AND gate 403 which only opens when these pulses are synchronous, which is only the case at the beginning of an odd frame. The output of this gate is connected to a setting input of the bistable circuit 402.

A display device of the type in question is not luminous per se and can only be used under external illumination. In the example illustrated, this external illumination is obtained by reflection on the metallic layer which forms the lines, this reflection being more or less diffuse according to the state of the liquid crystal. If the lines did not have a sufficient reflective power (due to the use of another material for example) it is possible to use a dielectric mirror deposited on these lines.

If a material other than a liquid crystal, such as the lithium niobate mentioned above, is used, the modifications to the optical properties introduced by the recording are not always directly visible so that it is advisable to make them show up. In the case of a modification to the index by birefraction (as happens with lithium niobate), it is possible for example to examine the device through a circular polarizer. Although the dimensions are small, by virtue of the use of a thermal phenomenon, they still allow close direct vision. One interesting application consists in incorporating this device in a headset useable in particular by an aircraft pilot.

In order to obtain an image of greater size, it is possible to use a projection system. This projection system has to be adapted to the diffusion phenomenon used so as to obtain a satisfactory contrast. Thus, it is possible to use a Schlieren lens, as in the device known by the name of Eidophore. However, it is equally possible to use a lens having a small numerical aperture which in a way functions oppositely to the Schlieren lens, i.e. by eliminating as many of the diffused rays as possible and by transmitting only the directly reflected rays.

Figure 5:
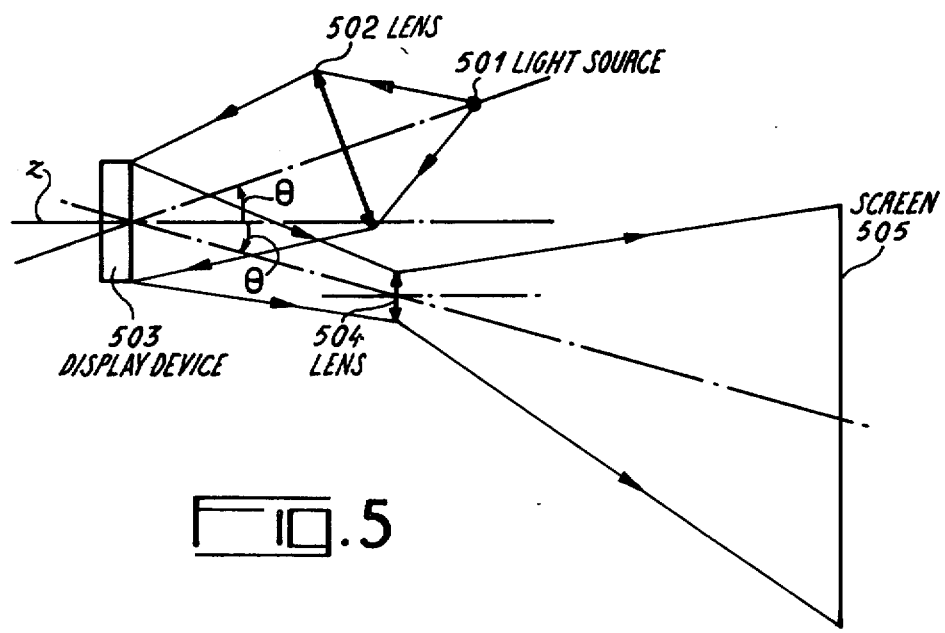
FIG. 5 illustrates the diagram of a first embodiment of a system for projecting the image displayed on the device of FIG. 2.

A projection system such as this is diagrammatically illustrated in FIG. 5. A light source 501 emitting a beam condensed by a condenser 502 illuminates a display cell 503 according to the ivention at a relatively small angle θ relative to the normal Z of the cell. The light reflected by the cell is divided, according to the recorded image, into a beam directly reflected at the same angle θ symmetrically in relation to the incident beam and a part diffused into the right-hand half-space. A projection lens 504, of which the aperture is just sufficient to collect the reflected beam, forms an enlarged image of the cell 503 on a projection screen 505. The respective inclinations and positions of the cell 503, the lens 504 and the screen 505 are selected in such a way that this image is not deformed, this in accordance with a method commonly used in cinematographic projection where the projector is rarely situated in the axis of the screen. Since the lens has a small aperture, it has a considerable field depth and minimal aberration, which facilitates its positioning relative to the cell and the screen.

It is pointed out that, in contrast to cathode ray tubes for example, the image is permanently recorded except for the line which is to be recorded during the period in which it is heated. Accordingly, this provides for a good contrast and a memory effect which may be utilised in cases where it is desired to freeze an image by stopping the arrival of the video signal.

In a liquid crystal cell, the smectic phase tends to be permanently slightly diffusing unless means are used to enable the liquid crystal to return spontaneously to a homogeneous and therefore completely transparent orderly phase. In order to overcome this phenomenon, it is possible for example to cover the surfaces of the substrates with a thin layer of a surfactant adapted to the liquid crystal and enabling the crystal to be slowly and spontaneously reoriented. At least one adequate surfactant is known for each liquid crystal; the product known by the name of Silane is very widely used and may be used in particular in cases where COB is used as the liquid crystal, as described above. In this case, the memory effect is lost under the effect of this spontaneous reorientation because the recorded image is erased after a period of a few tens of milliseconds. Accordingly, some of the contrast is lost in the event of use in a television system because the image is partly erased from one frame to the following frame, but the gain obtained is greater than the loss and the balance is positive.

In a case such as this, the use of Schlieren lens is of greater advantage because the spontaneous erasure of the image, in the case of a lens such as that illustrated in FIG. 5, leads to a lightening which is more unpleasant than the darkening introduced by the Schlieren lens.

FIG. 7 illustrates one example of embodiment of a projection system using a lens of this type. Through a condenser 702 and a semitransparent mirror 706, a light source 701 illuminates a display cell 703 with a condensed incident beam aligned with the normal Z to that cell. The reflected light is divided into a beam which is directly and quasispecularly reflected in the form of a beam F which is also aligned with Z, and a diffused part D. A wide-aperture projection lens 704 collects at least some of this part D and forms an enlarged image of the cell 703 on the projection screen 705.

An absorbing screen 707 preferably situated in front of the lens 704 and close to the focussing spot of the beam F absorbs this beam so that the image formed on the screen is formed solely by the diffused part D.

Figure 6:
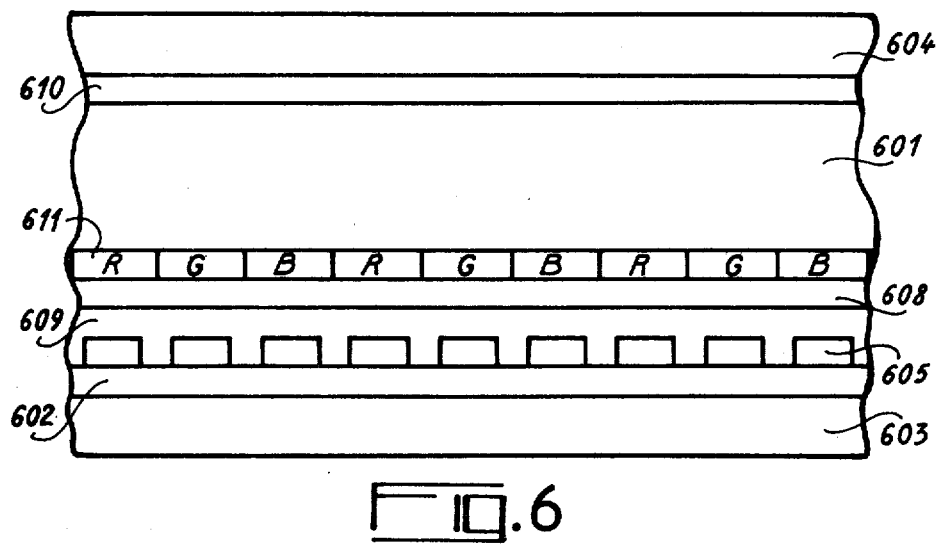
FIG. 6 illustrates a partial section view of a second embodiment of the display of FIG. 2.
Figure 8:
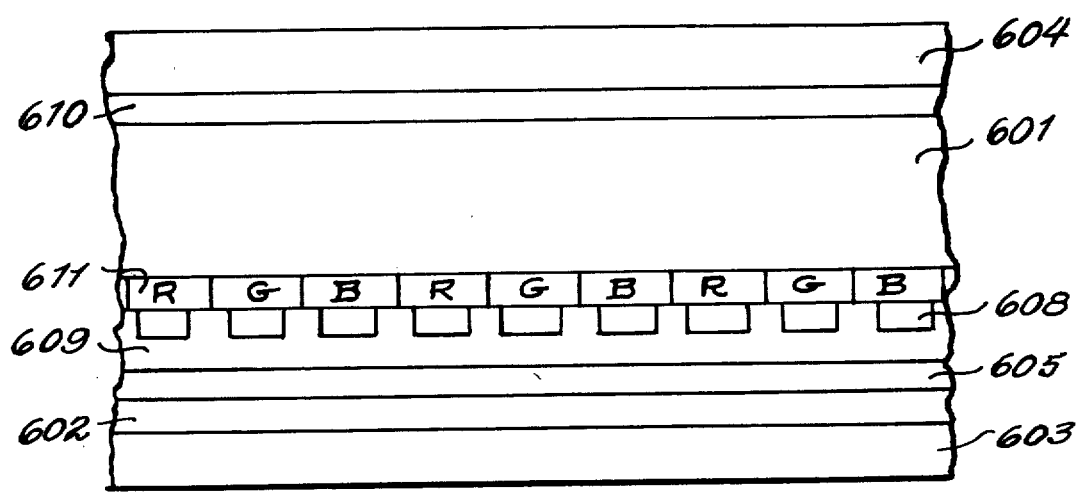
FIG. 8 illustrates a partial sectional view of a third embodiment of the display shown in FIG. 2.

FIG. 6 illustrates a section through part of another embodiment of a display device according to the invention. A liquid crystal layer 601 is inserted between a transparent substrate 604, for example of glass, and a substrate 603 of silicon. The substrate 603 carries an insulating layer 602 of silicon oxide ($SiO_2$) obtained by oxidation and on which the heating lines 605, seen in cross-section, are deposited. These lines are embedded in a layer 609 of silicon oxide obtained by sputtering. The columns 608, of which only one is visible in the FIG. in longitudinal section, are deposited on this layer 609. This enables the control element of the columns to be integrated in the substrate 603 and hence ordinary glass to be used for the substrate 604. The sampled voltages of the video signal are applied between these columns and a transparent counterelectrode 610 (for example of $Sn\ O_2$) at earth potential deposited on the inner surface of the substrate 604. In this embodiment, a dielectric mirror composed of bands 611 parallel to the lines 605 is deposited on the columns 608. These bands respectively reflect three colours additively synthesized from the colours—for example red, green and blue. They each correspond to one heating line and together form a regular permutation. Accordingly, it is possible by this device to reproduce a colored image, although the means used for this purpose may also be applied to the device shown in FIG. 1. This means may also assume other forms and, for example, the bands 611 may be parallel to the columns 608 illustrated in FIG. 8 or, alternatively, may simply be filtering and deposited on the substrate 604. Similarly, it is possible to carry out other syntheses (for example binary) adapted to particular systems.

Figure 2:
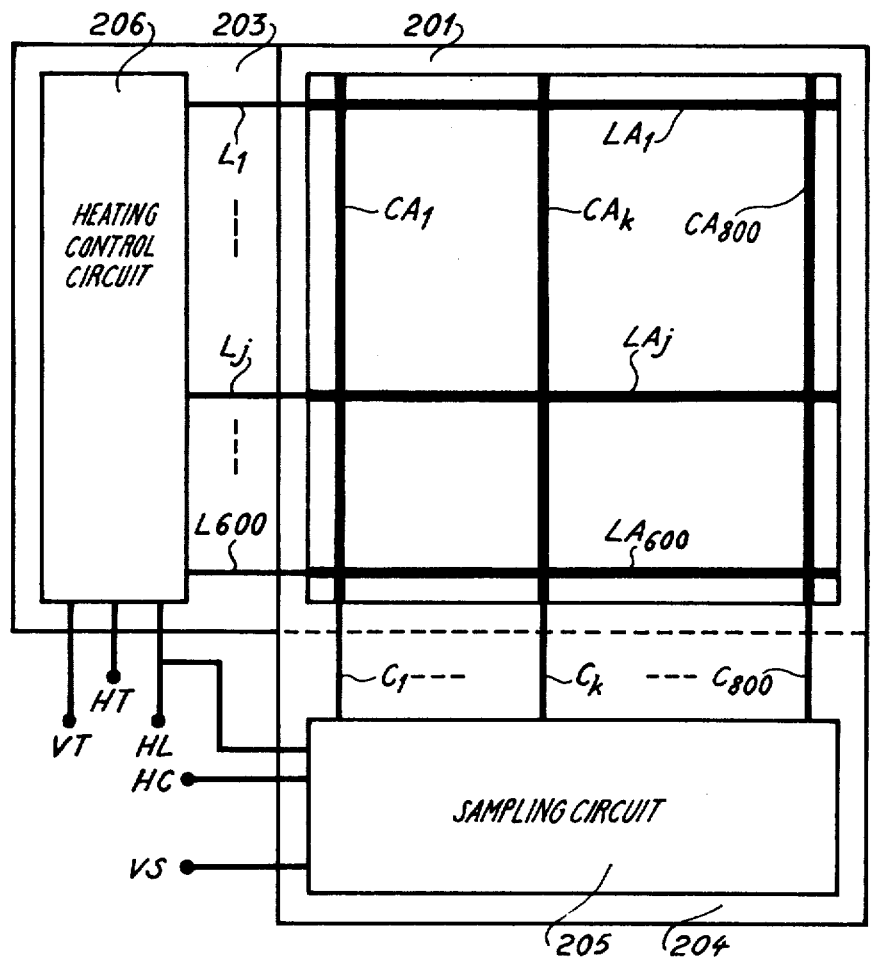
FIG. 2 illustrates a diagrammatic plan of a display device comprising 600×800 display points and control means.

Another embodiment of the device shown in FIG. 2 consists in using a substrate 204 of ordinary glass and in forming the control element 205 with thin-film transistors of the TFT-type.

To ensure that these devices function correctly, it is useful to control the liquid crystal layer and, hence, the entire cell thermostatically to a temperature slightly below (1 or 2° C.) the smectic-nematic transition temperature.

One effective way of doing this consists in depositing a transparent electrode on the surface of the transparent substrate and in passing through this electrode an electric current of which the value is adjusted in dependence upon the temperature of the substrate, this temperature being measured for example by a thermistor embedded in the substrate.

The devices thus described may be produced by the techniques used for the production of integrated circuits. To be effectively used, they only have to be fed with ordinary voltages and signals and illuminated by an optionally ambient light source or placed in a simple projection apparatus.

The invention covers any use of devices of the type in question for displaying moving or still images analysed in accordance with a standard which is adapted to the image to be displayed and which is not limited to the official television standards used in the present description.

What we claim is:

1. A display device for displaying images represented by a video signal comprising successive pluralities of successive portions, said device comprising:
   a thermoelectric recordable layer having a characteristic such that erasure of a recorded image occurs at an erasure temperature;
   means for heating above said temperature said layer along a plurality of lines corresponding respectively to said pluralities of successive portions of the video signal; said lines being heated temporarily one after the other and each line being heated simultaneously along its length;
   means for applying a plurality of electrical fields respectively to a plurality of portions of said layer overlying parts of each line after the heating of one of said lines and until said one line reaches a temperature below said erasure temperature, said plurality of electrical fields representing one of said successive pluralities of successive portions of the video signal, thereby causing said plurality of successive portions of the video signal to be recorded in said layer at said parts of said one line.

2. A device as claimed in claim 1 wherein said layer is made with liquid crystal; said device further comprising a first and a second substrates for holding said layer.

3. A device as claimed in claim 1, wherein said liquid crystal has a smectic phase under said erasure temperature and an isomorphic phase above said erasure temperature, and said liquid crystal is capable to become light-diffusing in relation with said electrical field during the cooling from said isomorphic phase to said smectic phase.

4. A device as claimed in claim 3, wherein said first substrate has a first surface and said second substrate has a second surface, said first and second surfaces enclosing said layer, and said heating means comprise a plurality of electrical resisting lines deposited onto said first surface.

5. A device as claimed in claim 4, wherein said heating means further comprise first control means for applying successively to each of said electrical resisting lines a voltage under the control of first external synchronising signals, whereby said electrical heating lines are heated under the action of said voltage.

6. A device as claimed in claim 5, wherein said first control means are a first circuit integrated into said first substrate.

7. A device as claimed in claim 6, wherein said means for applying a plurality of electrical fields comprise a plurality of transparent conductive electrodes substantially perpendicular to said plurality of electrical resisting lines and deposited onto said second surface.

8. A device as claimed in claim 7, wherein said means for applying a plurality of electrical fields further comprises second control means for sampling successively said vedeo signal and applying simultaneously a plurality of samples of said video signal onto respectively said electrodes, under the control of second external synchronising signals.

9. A device as claimed in claim 8, wherein said second substrate is made of sapphire, and said second control means are a second circuit integrated into said second substrate.

10. A device as claimed in claim 8, wherein said second substrate is made of glass, and said second control means are a second circuit made with thin-film-transistors deposited onto said second substrate.

11. A device as claimed in claim 6, further comprising an isolating layer deposited onto said plurality of electrical resisting lines, and wherein said means for applying a plurality of electrical fields comprise a plurality of conductive electrodes substantially perpendicular to said plurality of electrical resisting lines and deposited onto said isolating layer.

12. A device as claimed in claim 11, wherein said means for applying a plurality of electrical fields further comprise second control means for sampling successively said video signal and applying simultaneously a plurality of samples of said video signal onto respectively said electrodes, under the control of second external synchronising signals.

13. A device as claimed in claim 12, wherein said second control means are a circuit integrated into said first substrate.

14. A device as claimed in claim 13, further comprising a plurality of interdigited light filtering lines deposited onto said conductive electrodes; said light filtering lines covering respectively said electrical heating lines; whereby said device may be used for displaying colour images.

15. A device as claimed in claim 13, further comprising a plurality of interdigited light filtering lines deposited onto said conductive electrodes; said light filtering lines covering respectively said conductive electrodes; whereby said device may be used for displaying colour images.

16. A device as claimed in any of claims 9, 10, and 13, further comprising means for inducing said crystal layer to spontaneously return to a non diffusing state.

* * * * *